Patented Dec. 1, 1925.

1,563,515

UNITED STATES PATENT OFFICE.

EUDO MONTI, OF TURIN, ITALY.

PREPARATION OF CONCENTRATED UNALTERABLE FOODS.

No Drawing. Original application filed October 3, 1916, Serial No. 123,563. Divided and this application filed May 6, 1922. Serial No. 559,079.

*To all whom it may concern:*

Be it known that I, EUDO MONTI, a subject of the King of Italy, residing at 20 via Figlie dei Militari, Turin, Italy, have invented certain new and useful Improvements in Preparation of Concentrated Unalterable Foods, of which the following is a specification.

The present invention is a divisional application of my patent application No. 123,563, filed October 3rd. 1916, Patent No. 1,416,372, and relates to improvements in a process for the preparation of concentrated unalterable foods of excellent taste and easy digestion by treating alimentary substances, which are difficult to preserve and transport and are relatively cheap, with the residues of the wine, cheese and other industries.

According to my prior Patents No. 973,290, 1,065,829 and especially No. 1,167,006 dated Jan. 4th. 1916, I prepared concentrated unalterable foods by causing the alimentary substances (eggs, milk, blood, etc.) to be digested in the juice of grapes or other acid fruit concentrated first by the freezing process and afterwards in my lukewarm water vacuum concentrator at a temperature nearly that of the human body until the product contains less than 35% water.

I have now found that the "enzyms", to which this phenomenon of digestion is due, are chiefly found in the parts of the grape and other fruit which adhere to the skin, so that the grape pomace extract (prepared according to the method described in the above mentioned patent) will be richer in enzyms than the grape juice; moreover I found that partially fermented whey will also predigest the protein. I ascertained also that the digestive efficiency of grape pomace extract is greater than that of grape juice, therefore much smaller quantities will suffice in order to obtain the same effect and therefore blood, milk, eggs and the like digested in grape pomace extract may contain higher percentages of protein than the similar products obtained from grape juice; also the acidity may be considerably reduced, the experience having taught me that proteins (blood, milk, eggs and the like) digested long enough at the temperature of the human body in a medium rich of special enzyms and the acidity of which does not exceed the quivalent of 1 gram tartaric acid (about ½ gram hydrochloric acid) in one thousand grams of the product taste much better and are more healthful than the similar products digested in a shorter time, at a higher temperature in the presence of a high percentage of free acids. Of course if the quantity of sugar contained in the grape pomace for each gram of free acid is too small, other sugar (preferably milk, grape or fruit sugar, also inverted saccharose or molasses) may be added in order to sweeten and thicken the product, also to make it keep.

From the above facts I derived a proceeding of large industrial application for the preparation of the said concentrated and unalterable foods, substantially as described in my Patent No. 1,167,006 with the changes herein described.

Grape extract prepared in the way described, in the above referred patents also in my U. S. Patent No. 1,401,351 issued December 22nd, 1921, stirred with the fresh blood, fresh eggs, fresh or skimmed milk also centrifugated milk, whey and the like will make them keep for some time so that they can be transported to a factory provided with the necessary concentrating apparatuses and even stored for a length of time in a cold storage. By adding to the blood digested and concentrated in the way above described till it contains less than 30% moisture a suitable quantity of toasted and ground cocoa nuts also some sugar and flavouring according to taste and drying the paste thus obtained in stamps in a stream of dry air at a temperature not exceeding 40° C. I obtain an excellent chocolade containing 30% to 40% protein and 35 to 45% sugar whose feeding equivalent is therefore more than double its weight of good fresh meat, excellent in taste and keeping for any length of time in tin cans or glass pots and also in the open air wrapped in paper or tin.

By mixing the paste above described with about its weight of toasted flour eventually mixed with finely ground toasted bran, I obtain tablets or cakes having the taste of chocolade and containing about 20% predigested protein 5% fat, 25% sugar and 38% starch and other carbohydrates and 12% moisture excellent in taste and flavour and having the feeding equivalent of their weight of meat plus their weight of bread.

Natural milk also skimmed or centrifugated milk stirred with about 10% of their weight of concentrated grape pomace extract mixed with a suitable proportion of concentrated grape or fruit juice or inverted sugar will curdle but the curdling passed through a thick sieve and mixed again with the serum will emulsify after a short time and the emulsion will not alter for a day or two. The emulsion digested for three to four hours at about the temperature of the human body and concentrated till it contains about 80% of its weight of dry extract, in which 50% of milk, grape or other sugars or molasses will keep unaltered. If it contains more moisture or less sugar it will slowly ferment giving rise to a very interesting products, which I am now studying and will very likely be the object of a further application. Milk digested in grape or pomace extract is not as agreeable as the product I have and am now going to describe and claim, but is very interesting because it mixes in all proportions with said products improving their feeding equivalent also their taste and making them cheaper particularly if centrifugated milk is used.

Grape extract mixes in all proportions with predigested eggs or milk prepared according to the above referred to patents also with coffee and tea extract or ground cocoa. An extract containing the soluble matters of about 500 grams of coffee or tea in one hundred grams of concentrate can thus be easily prepared stored for any length of time and used after mixing it with a proportion of lukewarm water, concentrated cocoa can also be obtained in the same way by adding cocoa to the predigested milk and eggs. Said extracts are excellent in taste and will keep under any circumstances and emulsify in any proportion with lukewarm and even warm water giving for each tablespoonful an excellent cup of coffee, tea or chocolade with milk and eggs. The average analysis of said extract is 30 to 40% grape or milk sugar, also saccharose or molasses, about 10% emulsified fat, 28 to 30% protein, 200 grams of it diluted in 800 grams of water will therefore have the same feeding value of one liter of good milk, four eggs and the extract of from 50 to 100 grams of toasted coffee or dry tea.

Blood digested in grape extract may be mixed with good results with milk and eggs also with toasted cocoa nuts but not with tea or coffee because the mixture would not be agreeable to the taste.

Both the ampeloplastine, the blood and milk concentrated as above described may be baked after mixing them with a suitable percentage of wheat or corn flour, both producing excellent biscuits having the feeding equivalent of about their weight of meat and bread. If the biscuits are intended for sick people and must therefore contain unaltered the vitamines contained in fresh grapes milk and eggs, the flour must be toasted beforehand mixed with a suitable proportion of the above described products pressed in stamps and simply dried in an oven at a temperature not exceeding 50° C. Biscuits containing chocolade, coffee and the extracts must always be baked in that way in order not to alter the caffeine and the bromine which would evaporate at a high temperature while the raw flour would give an undesirable taste to the biscuits.

For alimentary purposes I make biscuits containing a suitable proportion of predigested blood, milk or eggs or a mixture of them mixing said predigested and concentrated foods with a little more than their weight of wasted corn or wheat flour or a mixture of both, stir the mixture and work it into a thick dough adding if necessary a little yeast or baking powder also some soda water. The dough is then pressed into stamps to make biscuits weighing from ten to twenty grams each, which are soaked in a hot water oven or even in a usual oven provided the temperature does not exceed 100° C. because the biscuits being slightly acid the protein (especially the protein of the blood) will alter and burn at a temperature a little over the boiling point of water while in order to make said biscuits taste good and keep for a long time it is necessary to warm them at a temperature very near to said point. To make said biscuits I preferably use corn flour, from which both the bran and the flinty part have been separated. The corn flour thus obtained contains from 5 to 10% corn oil, I add 5 to 10% vegetable butter and some wheat flour if necessary in order to make the biscuits stick together. In order to make the biscuits spongy I add occasionally some baking powder but this addition is unnecessary when the pomace extract contains enough of cream of tartar. I obtain thus very light and spongy biscuits, tasting very good and keeping for the longest time even in the open air (provided they are in a dry place).

Further experiments have shown that the enzyms which in proper conditions will predigest protein, exist also in the layer adhering to the inner part of the peels of several berries such as currants, gooseberries, raspberries, and the like also in tomato juice peels and extracts, also in the whey separated from the cheese which worked in the way described in my U. S. Patent 1,167,000 will also give excellent preparations provided that lactic acid which would give to such preparations an undesirable taste is completely separated at a temperature not exceeding 50° C.

The digestion and the simultaneous concentration must be carried on in such a way as not to alter that small percentage of albumin which does not coagulate at the temperature of from 65° to 75° C., but does at 100° C. This has for its effect the possibility of obtaining when convenient, by the subsequent sterilization of the product at 100° C., a food which, through being solid, retains the property of dissolving in cold and hot water giving emulsions having the characters of fresh eggs, milk and chocolade stirred with milk or water. I must here remark that grape peels are very rich in vitamines which will not loose their activity during the process of digestion and concentration at the temperature of the human body but will loose it if sterilized at a temperature above 70° C. as it is the case for biscuits and products sterilized in cans above said temperature.

What I claim is:

1. The process consisting in predigesting protein compounds in fruit extract, adding an absorbent food constituent, and suitably drying the whole.

2. The process consisting in predigesting protein compounds in fruit extract, adding a substantially equal weight of flour and desired flavoring, and drying the whole in an oven at a temperature not exceeding the boiling point of water.

3. The process consisting in predigesting protein compounds in fruit extract, adding a substantially equal weight of flour which has been previously torrefied, together with the desired flavoring, sugar and baking powder, and drying the whole in an oven at a temperature not exceeding the boiling point of water.

The foregoing specification signed at Turin, Italy, this 21st day of April, 1922.

EUDO MONTI.